United States Patent
Sokolov et al.

(10) Patent No.: US 10,289,865 B1
(45) Date of Patent: May 14, 2019

(54) SYSTEMS AND METHODS FOR PROVIDING KINSHIP-BASED ACCESSIBILITY TO SECURELY STORED DATA

(71) Applicant: Symantec Corporation, Mountain View, CA (US)

(72) Inventors: Ilya Sokolov, Boston, MA (US); Kevin Jiang, Lafayette, CA (US)

(73) Assignee: Symantec Corporation, Mountain View, CA (US)

( * ) Notice: Subject to any disclaimer, the term of this patent is extended or adjusted under 35 U.S.C. 154(b) by 536 days.

(21) Appl. No.: 15/063,538

(22) Filed: Mar. 8, 2016

(51) Int. Cl.
*H04L 9/08* (2006.01)
*G06F 21/62* (2013.01)

(52) U.S. Cl.
CPC ........ *G06F 21/6245* (2013.01); *H04L 9/0866* (2013.01)

(58) Field of Classification Search
CPC .......................... G06F 21/6245; H04L 9/0866
See application file for complete search history.

(56) References Cited

U.S. PATENT DOCUMENTS

| | | | |
|---|---|---|---|
| 8,458,494 B1 | 6/2013 | Bogorad | |
| 2006/0041930 A1* | 2/2006 | Hafeman | G06F 21/6245 726/2 |
| 2011/0213807 A1* | 9/2011 | Mattsson | G06F 21/6245 707/802 |
| 2013/0103951 A1* | 4/2013 | Klevan | H04L 9/3231 713/186 |
| 2016/0292455 A1* | 10/2016 | Jebara | G06F 17/30867 |

OTHER PUBLICATIONS

"Second Generation Multiplex Plus", https://en.wikipedia.org/wiki/Second_Generation_Multiplex_Plus, as accessed Jan. 13, 2016, Wikipedia, (Sep. 13, 2006).
"Number of AES-256 operations per second on a maximized Cray XE6", http://security.stackexchange.com/questions/9072/number-of-aes-256-operations-per-second-on-a-maximized-cray-xe6, as accessed Jan. 13, 2016, (Nov. 20, 2011).

(Continued)

*Primary Examiner* — Khoi V Le
(74) *Attorney, Agent, or Firm* — FisherBroyles, LLP

(57) ABSTRACT

A computer-implemented method for providing kinship-based accessibility to securely stored data may include (1) identifying encrypted data that is encrypted with a first cryptographic key which was derived from heritable biometric information obtained from a first person, (2) receiving heritable biometric information obtained from a second person related to the first person within a predetermined degree, (3) generating a second cryptographic key based at least in part on the heritable biometric information obtained from the second person, and (4) decrypting the encrypted data that is encrypted with the first cryptographic key derived from the heritable biometric information obtained from the first person by using the second cryptographic key generated based at least in part on the heritable biometric information obtained from the second person. Various other methods, systems, and computer-readable media are also disclosed.

20 Claims, 7 Drawing Sheets

(56) References Cited

OTHER PUBLICATIONS

Najaftorkaman, Mohammadreza et al., "A Method to Encrypt Information with DNA-Based Cryptography", http://sdiwc.us/digitlib/journal_paper.php?paper=00001439.pdf, as accessed Jan. 13, 2016, International Journal of Cyber-Security and Digital Forensics (IJCSDF) 4(3), The Society of Digital Information and Wireless Communications, (2015), pp. 417-426.

Hoard, Bruce, "Data Storage in a Petri Dish", http://www.pcworld.com/article/130429/article.html, as accessed Jan. 13, 2016, (Apr. 6, 2007).

\* cited by examiner

SYSTEMS AND METHODS FOR PROVIDING KINSHIP-BASED ACCESSIBILITY TO SECURELY STORED DATA

BACKGROUND

Consumers increasingly use third-party services to store data. Third-party storage services may provide a number of benefits to customers, including flexibility, low capitalization requirements, add-on services, and centralized access to data. As online data storage increases, individuals are building ever greater personal "digital estates." These digital estates may include a variety of important digital assets ranging from key legal and financial electronic documents to creative works to representations of cherished memories. Furthermore, as the paperless trend continues, personal digital estates may become the primary or only source for certain records.

To improve privacy and individual control over data, third-party storage customers and/or third-party storage services may encrypt stored data. Individual third-party storage customers may enjoy exclusive access to their data by means of an authentication token, such as a password. However, the perfection of individual control over data may clash with the realities of social life. Family members share common legal, financial, and personal interests and obligations. Traditionally, family members with common access to a physical space (e.g., a filing cabinet) shared common access to important information. However, when a family member controls important electronic information in a personal digital account, the important electronic information can suddenly disappear with the family member (e.g., upon death).

Accordingly, the instant disclosure identifies and addresses a need for additional and improved systems and methods for providing kinship-based accessibility to securely stored data.

SUMMARY

As will be described in greater detail below, the instant disclosure generally relates to systems and methods for providing kinship-based accessibility to securely stored data by using cryptographic keys based on heritable biometric information (e.g., genetic markers). A person's data may be encrypted with a cryptographic key derived from the person's heritable biometric information. A relative may then decrypt the data with a cryptographic key derived from the relative's heritable biometric information. In some examples, the systems described herein may use k-out-of-n cryptographic schemes that allow decryption using only a subset of the data components originally used for encryption.

In one example, a computer-implemented method for providing kinship-based accessibility to securely stored data may include (1) identifying encrypted data that is encrypted with a first cryptographic key which was derived from heritable biometric information obtained from a first person, (2) receiving heritable biometric information obtained from a second person related to the first person within a predetermined degree, (3) generating a second cryptographic key based at least in part on the heritable biometric information obtained from the second person, and (4) decrypting the encrypted data that is encrypted with the first cryptographic key derived from the heritable biometric information obtained from the first person by using the second cryptographic key generated based at least in part on the heritable biometric information obtained from the second person.

In one embodiment, the heritable biometric information obtained from the first person may include a group of genetic markers obtained from the first person and the heritable biometric information obtained from the second person may include a group of genetic markers obtained from the second person.

In one embodiment, (1) the first person may include a first female person, (2) the second person may include a second female person, (3) the heritable biometric information obtained from the first person may be derived from mitochondrial DNA obtained from the first person, and (4) the heritable biometric information obtained from the second person may be derived from mitochondrial DNA obtained from the second person.

In one embodiment, (1) the first person may include a first male person, (2) the second person may include a second male person, (3) the heritable biometric information obtained from the first person may be derived from a Y chromosome of the first person, and (4) the heritable biometric information obtained from the second person may be derived from a Y chromosome of the second person.

In one embodiment, the encrypted data may have been encrypted with the first cryptographic key using a k-out-of-n encryption scheme.

In one embodiment, the first cryptographic key may have been derived from a group of allele pairs present in the first person. In this embodiment, generating the second cryptographic key may include selecting, for each allele pair in the allele pairs, an allele in a corresponding allele pair of the second person to contribute to the second cryptographic key.

In some examples, generating the second cryptographic key may include generating a group of candidate cryptographic keys by selecting, for each candidate cryptographic key in the candidate cryptographic keys, a different combination of alleles from a group of allele pairs present in the second person that correspond to the allele pairs present in the first person and testing each candidate cryptographic key in the candidate cryptographic keys until identifying the second cryptographic key that successfully decrypts the encrypted data.

In one embodiment, a parameter of the k-out-of-n encryption scheme may be selected based at least in part on a relationship requirement for decrypting the data that specifies how closely related the first person and a candidate person are to be related for the candidate person to access the encrypted data in plaintext form.

In one embodiment, a parameter of the k-out-of-n encryption scheme may be selected based at least in part on a computational threshold, where a computational burden imposed by searching for the second cryptographic key based on heritable biometric information obtained from the second person falls below the computational threshold and a computational burden imposed by searching for the second cryptographic key without heritable biometric information obtained from any person with a genetic relationship to the first person as close as a genetic relationship between the first person and the second person rises above the computational threshold.

In some examples, generating the second cryptographic key may be further based at least in part on heritable biometric information obtained from a third person related to the first person.

In one embodiment, the encrypted data may have been stored on behalf of the first person pseudonymously.

In some examples, decrypting the encrypted data may include decrypting an additional cryptographic key that is capable of decrypting private data owned by the first person.

In some examples, the computer-implemented method may further include providing access to the encrypted data in plaintext form to the second person after decrypting the encrypted data.

In one embodiment, a system for implementing the above-described method may include (1) an identification module, stored in memory, that identifies encrypted data that is encrypted with a first cryptographic key which was derived from heritable biometric information obtained from a first person, (2) a receiving module, stored in memory, that receives heritable biometric information obtained from a second person related to the first person within a predetermined degree, (3) a generation module, stored in memory, that generates a second cryptographic key based at least in part on the heritable biometric information obtained from the second person, (4) a decryption module, stored in memory, that decrypts the encrypted data that is encrypted with the first cryptographic key derived from the heritable biometric information obtained from the first person by using the second cryptographic key generated based at least in part on the heritable biometric information obtained from the second person, and (5) at least one physical processor configured to execute the identification module, the receiving module, the generation module, and the decryption module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify encrypted data that is encrypted with a first cryptographic key which was derived from heritable biometric information obtained from a first person, (2) receive heritable biometric information obtained from a second person related to the first person within a predetermined degree, (3) generate a second cryptographic key based at least in part on the heritable biometric information obtained from the second person, and (4) decrypt the encrypted data that is encrypted with the first cryptographic key derived from the heritable biometric information obtained from the first person by using the second cryptographic key generated based at least in part on the heritable biometric information obtained from the second person.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
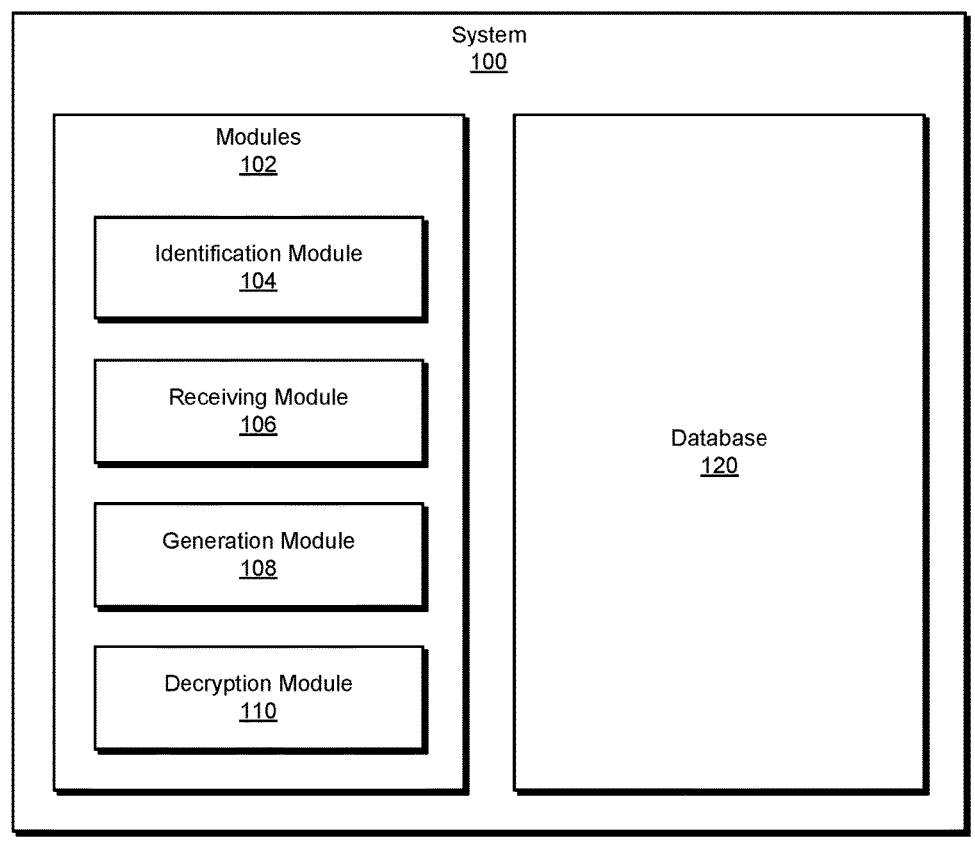
FIG. 1 is a block diagram of an exemplary system for providing kinship-based accessibility to securely stored data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing kinship-based accessibility to securely stored data. As will be explained in greater detail below, by using cryptographic keys based on heritable biometric information (e.g., genetic markers), the systems and methods described herein may allow one or more relatives of a person to access data securely stored by that person based on the relatives' own biometric information. In some examples, the systems described herein may use k-out-of-n cryptographic schemes that allow decryption using only a subset of the data components originally used for encryption. In this manner, the systems described herein may allow data that has been encrypted using a cryptographic key based on an individual's biometric information to be decrypted with a cryptographic key generated from a relative that shares some, but not all, of the individual's biometric information.

Figure 2:
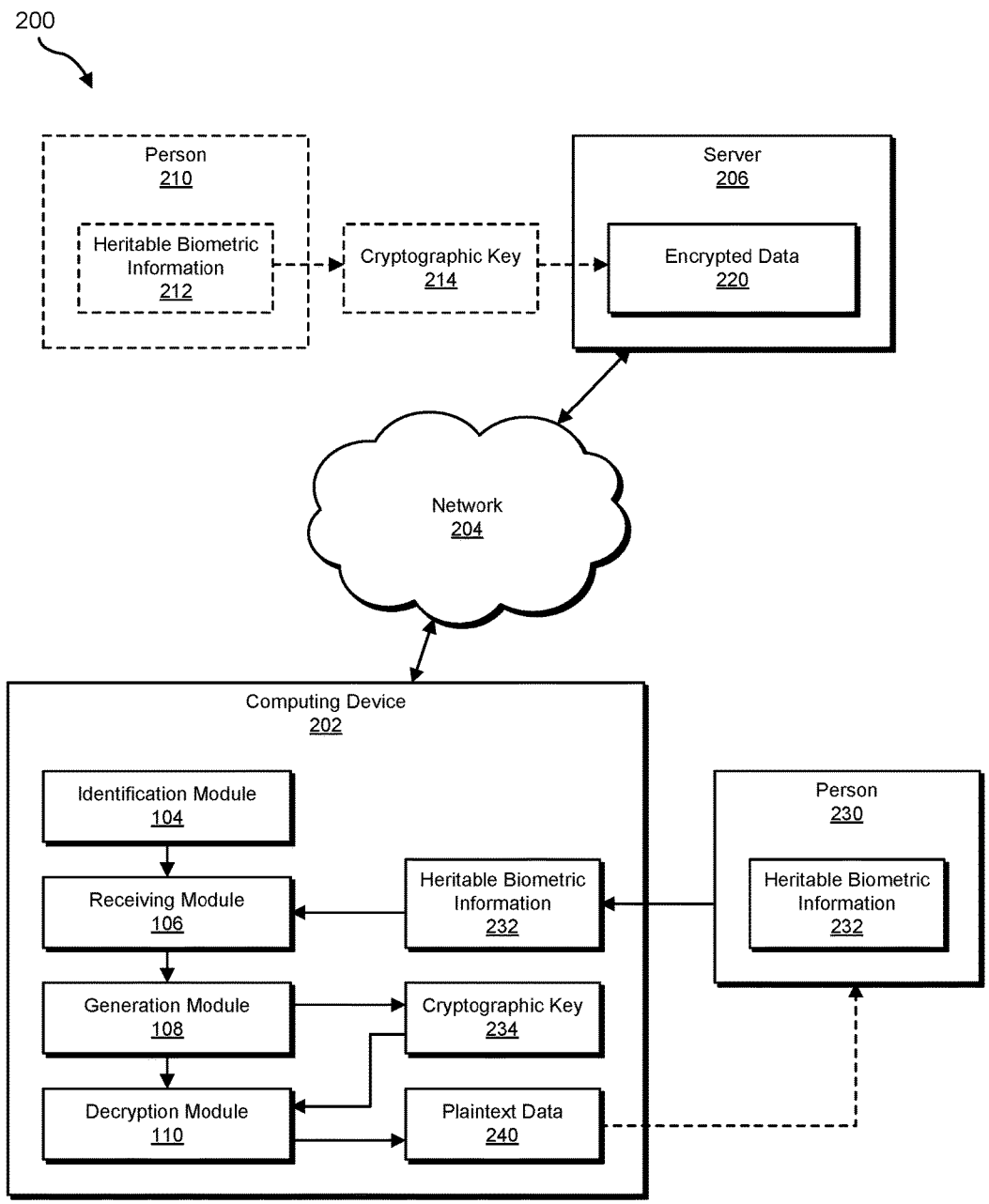
FIG. 2 is a block diagram of an additional exemplary system for providing kinship-based accessibility to securely stored data.

The following will provide, with reference to FIGS. 1-2, detailed descriptions of exemplary systems for providing kinship-based accessibility to securely stored data. Detailed descriptions of corresponding computer-implemented methods will also be provided in connection with FIG. 3. Detailed descriptions of exemplary heritable biometric information will be provided in connection with FIG. 4. Detailed descriptions of an exemplary family making use of cryptographic techniques based on heritable biometric information will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for providing kinship-based accessibility to securely stored data. As illustrated in this figure, exemplary system 100 may include one or more modules 102 for performing one or more tasks. For example, and as will be explained in greater detail below, exemplary system 100 may include an identification module 104 that identifies encrypted data that is encrypted with a first cryptographic key which was derived from heritable biometric information obtained from a first person. Exemplary system 100 may additionally include a receiving module 106 that receives heritable biometric information obtained from a second person related to the first person within a predetermined degree. Exemplary system 100 may also include a generation module 108 that generates a second cryptographic key based at least in part on the heritable biometric information obtained from the second person. Exemplary system 100 may additionally include a decryption module 110 that decrypts the encrypted data that is encrypted with the first cryptographic key derived from the heritable biometric information obtained from the first person by using the second cryptographic key generated based at least in part on the heritable biometric information obtained from the second person.

Decryption module 110 may further decrypt the encrypted data that is encrypted with the first cryptographic key derived from the heritable biometric information obtained from the first person by using the second cryptographic key generated based at least in part on the heritable biometric information obtained from the second person. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data that has been encrypted using a cryptographic key derived from an individual's heritable biometric information.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to provide kinship-based accessibility to securely stored data. For example, and as will be described in greater detail below, one or more of modules 102 may cause computing device 202 and/or server 206 to facilitate a person 230 related to a person 210 to decrypt and/or access in decrypted form encrypted data 220 stored for person 210. For example, and as will be described in greater detail below, identification module 104 may identify encrypted data 220 that is encrypted with a cryptographic key 214 which was derived from heritable biometric information 212 obtained from a person 210. Receiving module 106 may receive heritable biometric information 232 obtained from a person 230 who is related to person 210 within a predetermined degree. Generation module 108 may generate a cryptographic key 234 based at least in part on heritable biometric information 232 obtained from person 230. Decryption module 110 may decrypt encrypted data 220 that is encrypted with cryptographic key 214 derived from heritable biometric information 212 obtained from person 210 by using cryptographic key 234 generated based at least in part on heritable biometric information 232 obtained from person 230.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, computing device 202 may represent a client-side, end-user device. Additionally or alternatively, computing device 202 may represent a computing device operating as a part of a cloud storage platform and/or third-party storage service.

Server 206 generally represents any type or form of computing device that is capable of storing, managing, encrypting, decrypting, and/or accessing data. Examples of server 206 include, without limitation, application servers and database servers configured to provide various database services and/or run certain software applications. In some examples, server 206 may represent a portion of a cloud storage platform and/or a third-party storage service.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
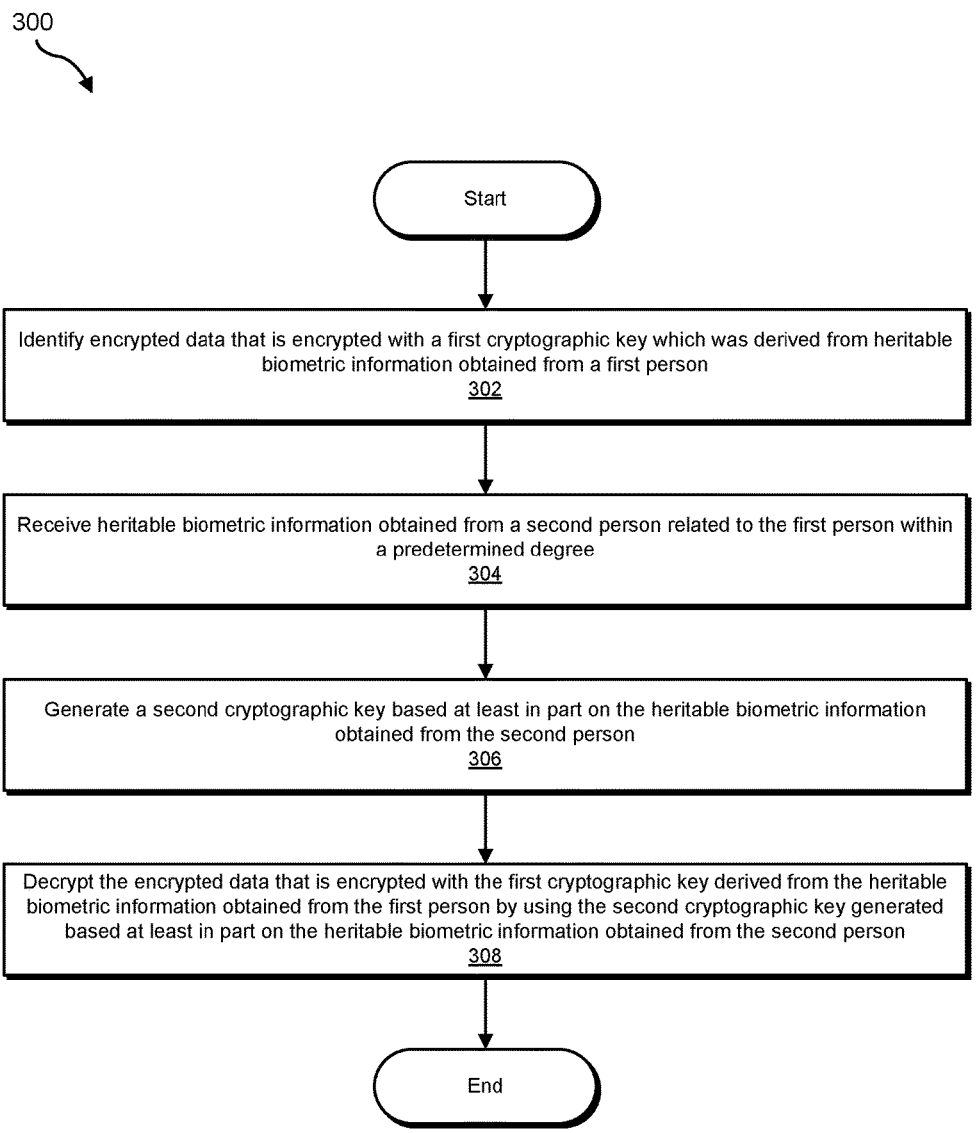
FIG. 3 is a flow diagram of an exemplary method for providing kinship-based accessibility to securely stored data.

FIG. 3 is a flow diagram of an exemplary computer-implemented method 300 for providing kinship-based accessibility to securely stored data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify encrypted data that is encrypted with a first cryptographic key which was derived from heritable biometric information obtained from a first person. For example, identification module 104 may, as part of computing device 202 in FIG. 2, identify encrypted data 220 that is encrypted with a cryptographic key 214 which was derived from heritable biometric information 212 obtained from a person 210.

The encrypted data may include any of a variety of data. For example, the encrypted data may include data owned and/or stored on behalf of the first person (e.g., by a third-party and/or cloud-based storage service). Additionally or alternatively, the encrypted data may include a cryptographic key. For example, the encrypted data may include a cryptographic key that, in turn may be used to decrypt data owned and/or stored on behalf of the first person. In one example, the encrypted data may include a random cryptographic key (e.g., that was randomly generated) used to encrypt data owned and/or stored on behalf of the first person and that was subsequently combined with (e.g., encrypted using) the first cryptographic key (e.g., that was derived from heritable biometric information obtained from the first person). For example, an exclusive or (XOR) operation may combine the random cryptographic key with the first cryptographic key to produce the encrypted data.

The term "cryptographic key," as used herein, may refer to any value and/or set of values for use in one or more cryptographic functions to perform one or more cryptographic operations. In some examples, the term "cryptographic key" may refer to a symmetric key. In some examples, the term "cryptographic key" may refer to an asymmetric key pair (and/or an encryption key and/or a decryption key within an asymmetric key pair).

The encrypted data may be encrypted with the first cryptographic key using any suitable encryption scheme. In some examples (e.g., where the data encrypted with the first cryptographic key is, itself, a randomly generated cryptographic key), the encrypted data may be encrypted with an XOR cipher. In some examples, the encrypted data may be encrypted using a k-out-of-n encryption scheme. The term "k-out-of-n encryption scheme," as used herein, generally refers to any encryption scheme, procedure, and/or function whereby data that is encrypted using a set of information can be decrypted with an adequately large (but incomplete) subset of the information. For example, the term "k-out-of-n encryption scheme" may refer to an encryption scheme whereby n values are used to encrypt data but only k of the n values are needed to decrypt the data. In one example, data that is encrypted with a cryptographic key that includes 60 secret values may be decrypted with a cryptographic key that includes any 30 of the secret values (but, e.g., that does not include any values not within the original 60 secret values). Accordingly, in some examples the first cryptographic key may be composed of n values according to a k-out-of-n encryption scheme.

In some examples, systems described herein may use and/or select parameters for the k-out-of-n encryption scheme appropriate to and/or based on a target cryptographic strength and/or a target kinship scope for decryption. For example, one or more of the systems described herein may select a parameter of the k-out-of-n encryption scheme based at least in part on a relationship requirement for decrypting the data that specifies how closely related the first person and a candidate person are to be related for the candidate person to access the encrypted data in plaintext form. For example, to allow a data owner to share access to encrypted data with immediate family members (e.g., parents, siblings, and/or children), the systems described herein may use a k-out-of-n encryption scheme using n genetic markers to encrypt the data and allowing the data to be decrypted with approximately (e.g., slightly less than) n/2 of the n genetic markers. To allow a data owner to share access to encrypted data with grandparents, grandchildren, nieces, nephews, aunts, and uncles, the systems described herein may use a k-out-of-n encrypt scheme using n genetic markers to encrypt the data and allowing the data to be decrypted with approximately (e.g., slightly less than) n/4 of the n genetic markers. In addition, in some examples, where the proportionate size of k is reduced to increase the scope of family members who are entitled to decrypt the data, the systems described herein may select a larger n to strengthen the encryption against attacks.

In one example, systems described herein may select a parameter of the k-out-of-n encryption scheme based at least in part on a computational threshold. For example, the computational threshold may represent an amount of computing resources that is impractical to devote to decrypting the encrypted data (e.g., for an individual attacker and/or for an institutional attacker) at the present time and/or into the projected future. In this example, a computational burden imposed by searching for the second cryptographic key based on heritable biometric information obtained from the second person may fall below the computational threshold and a computational burden imposed by searching for the second cryptographic key without heritable biometric information obtained from any person with a genetic relationship to the first person as close as a genetic relationship between the first person and the second person may rise above the computational threshold. Accordingly, where encrypted data is configured to be decryptable by an immediate family member, a k and an n of the k-out-of-n encryption scheme may be selected such a search for a cryptographic key to decrypt the data, where the search is based on heritable biometric information from an immediate family member (or the equivalent—e.g., combined heritable biometric information procured from several more distant relatives), will, in terms of computational cost, fall below the computational threshold, whereas a search for a cryptographic key to decrypt the data without the benefit of heritable biometric information from an immediate family member would require computational resources above the computational threshold to succeed (and thus be impractical).

The term "heritable biometric information," as used herein, may refer to any biometric information that can be derived from an individual and that can be at least partially consistent across family members owing to biological inheritance. For example, the term "heritable biometric information" may refer to genetic markers (and/or values representing and/or derived from genetic markers). Genetic markers relied upon by the systems and methods described herein may include any suitable genetic markers, including, e.g., sequences in mitochondrial deoxyribonucleic acid ("DNA"), sequences in Y chromosomal DNA, sequences in autosomal DNA, and/or values representing and/or derived from such DNA sequences. In some examples, the systems and methods described herein may rely on genetic markers with a high degree of entropy across the general population (e.g., such that the presence of a genetic marker of a given value in two individuals is more informative of the existence of a relationship between the two individuals). In some examples, a genetic marker may include an allele pair (e.g., one allele inherited from each parent). In some examples, a genetic marker may include a microsatellite (e.g., a sequence that includes a repeated subsequence), where a number of short tandem repeats occurring within the microsatellite may vary across the general population. Accordingly, the heritable biometric information may include a value that represents an allele length. In some examples, the systems and methods described herein may rely upon one or more genetic markers representing non-coding genetic information (e.g., such that mutations of the genetic information are biologically silent and therefore may accumulate more easily across generations, thereby potentially becoming more useful for determining genetic distance between individuals).

In one example, the heritable biometric information obtained from the first person may include a plurality of genetic markers obtained from the first person. For example, the heritable biometric information obtained from the first person may include a set of values, derived from a set of allele pairs, each value representing a characteristic of an allele (e.g., a length of the allele). As used herein, the term "allele" may refer to a version of a gene (e.g., a genetic sequence) locatable at a given genetic locus. As used herein, the term "allele pair" may refer to a pair of alleles locatable at the same loci of homologous chromosomes.

In one example, the first person may be female and the heritable biometric information obtained from the first person may be derived from mitochondrial DNA obtained from the first person. As will be explained in greater detail below, in this example, children of the first person may possess identical (or nearly identical) mitochondrial DNA and thus may be capable of producing matching heritable biometric information. Similarly, whether the first person is male or female, a mother of the first person may possess identical (or near identical) mitochondrial DNA and thus may be capable of producing matching heritable biometric information.

In one example, the first person may be male and the heritable biometric information obtained from the first person may be derived from a Y chromosome of the first person. As will be explained in greater detail below, a son (or father) of the first person may possess identical (or nearly identical) Y chromosomal DNA and thus may be capable of producing matching heritable biometric information.

The heritable biometric information may have been obtained from the first person in any suitable manner. For example, the heritable biometric information may be obtained from the first person by obtaining biological material from the first person that contains DNA and then conducting a DNA profiling test with the biological material. In some examples, data derived from the DNA profiling test may be interpreted, transformed, and/or formatted according to a consistent, predefined mapping such that obtaining heritable biometric information from the same DNA will produce the same values. In some examples, systems described herein may use a DNA profiling system such as Second Generation Multiplex Plus.

Identification module 104 may identify the encrypted data in any suitable context. For example, identification module 104 may operate as a part of a third-party storage service (e.g., a cloud storage service) that stores data on behalf of the first person. Additionally or alternatively, identification module 104 may operate as a part of an Internet service that, in the course of providing a service to the first person, stored data to provide the service for the first person. Examples of third-party services within which identification module 104 may operate include, without limitation, a photo storage and/or sharing service, a video storage and/or sharing service, a social networking service, a financial transaction service, a secure storage service, a communication service (e.g., an email service), and a backup service.

In some examples, identification module 104 may identify the encrypted data following a request to access and/or decrypt the encrypted data. For example, the encrypted data may be associated with a user account of the first person for an online service and a relative of the first person may initiate an account and/or data recovery procedure for the online service (e.g., because the first person is deceased). Additionally or alternatively, a relative of the first person may initiate a data sharing request through the online service (so that the relative can access and/or share data within the user account of the first person).

In one example, an online service may store the encrypted data on behalf of the first person pseudonymously. For example, the first person may have stored the encrypted data with the online service without providing personally identifying information to the online service and/or without basing outward-facing account information (e.g., a username) on personally identifying information. In some examples, while a user account of the first person may not be pseudonymous, the systems described herein may initiate an account data recovery and/or sharing procedure via a pseudonymous identifier rather than via an identifier that publicly identifies the first person. Because heritable biometric information may be non-revocable, by storing the encrypted data for the first person under a unique user identifier that is not traceable back to the user without client-side authentication, the systems described herein may reduce the potential of illegitimate attempts to access data stored for the first person.

Figure 4:
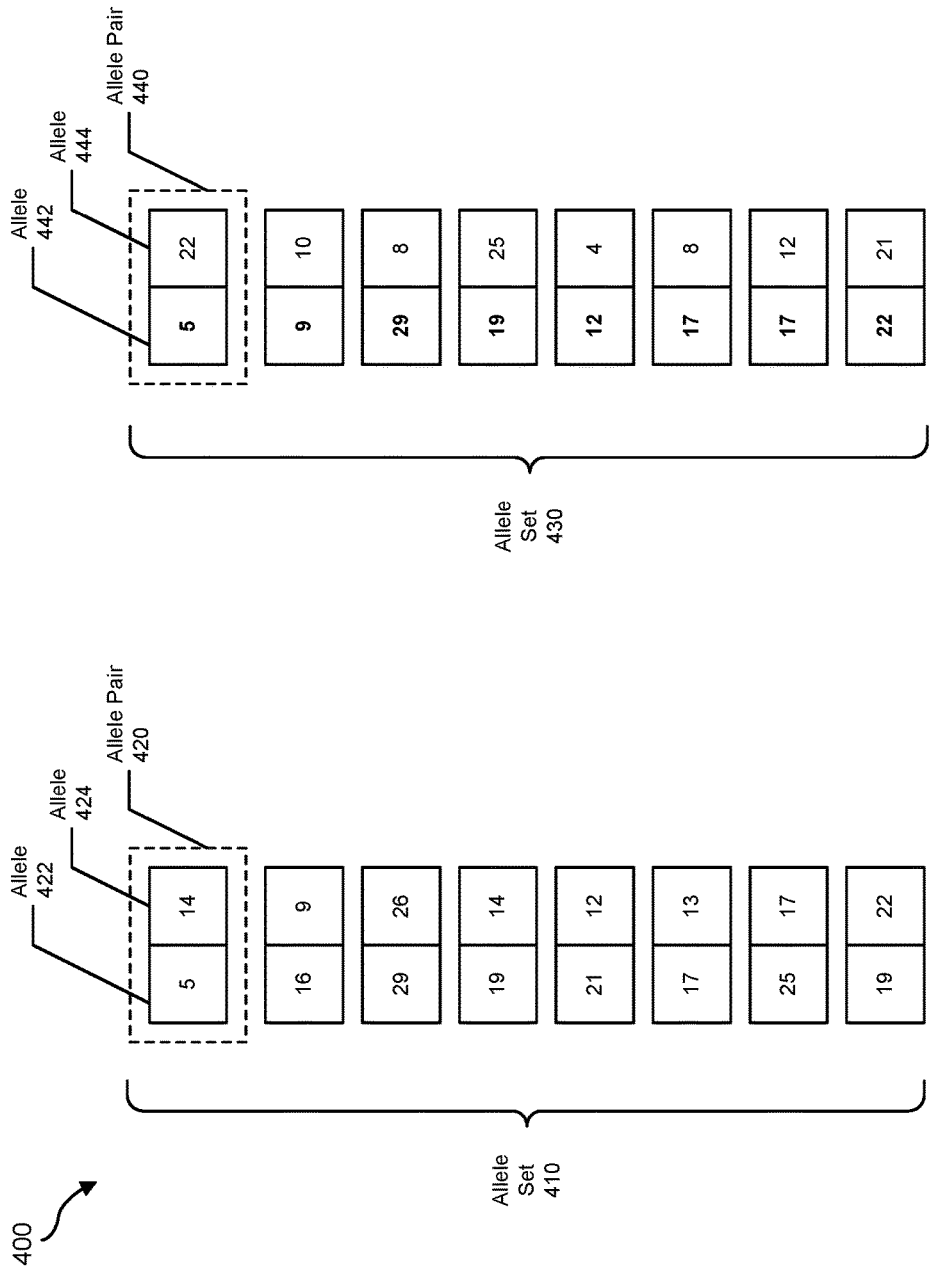
FIG. 4 is a block diagram of exemplary heritable biometric information that may be used to generate cryptographic keys for providing kinship-based accessibility to securely stored data.

FIG. 4 illustrates exemplary heritable biometric information 400. As shown in FIG. 4, heritable biometric information 400 may include an allele set 410 (e.g., derived from an individual who stores encrypted data). Allele set 410 may include various allele pairs, including an allele pair 420. Allele pair 420 may include an allele 422 and an allele 424. Each allele in allele set 410 may be represented by a numerical value (e.g., representing the length of the allele). In one example, systems described herein may generate a cryptographic key for an individual from the allele values of allele set 410 (e.g., each allele value representing a discrete secret in a k-out-of-n encryption scheme). Systems described herein may encrypt data (e.g., primary data and/or a cryptographic key capable of decrypting primary data) for the individual with the cryptographic key. When a relative of the individual wishes to access and/or decrypt the encrypted data, identification module 104 may identify the encrypted data that was encrypted with a cryptographic key derived from allele set 410.

Figure 5:
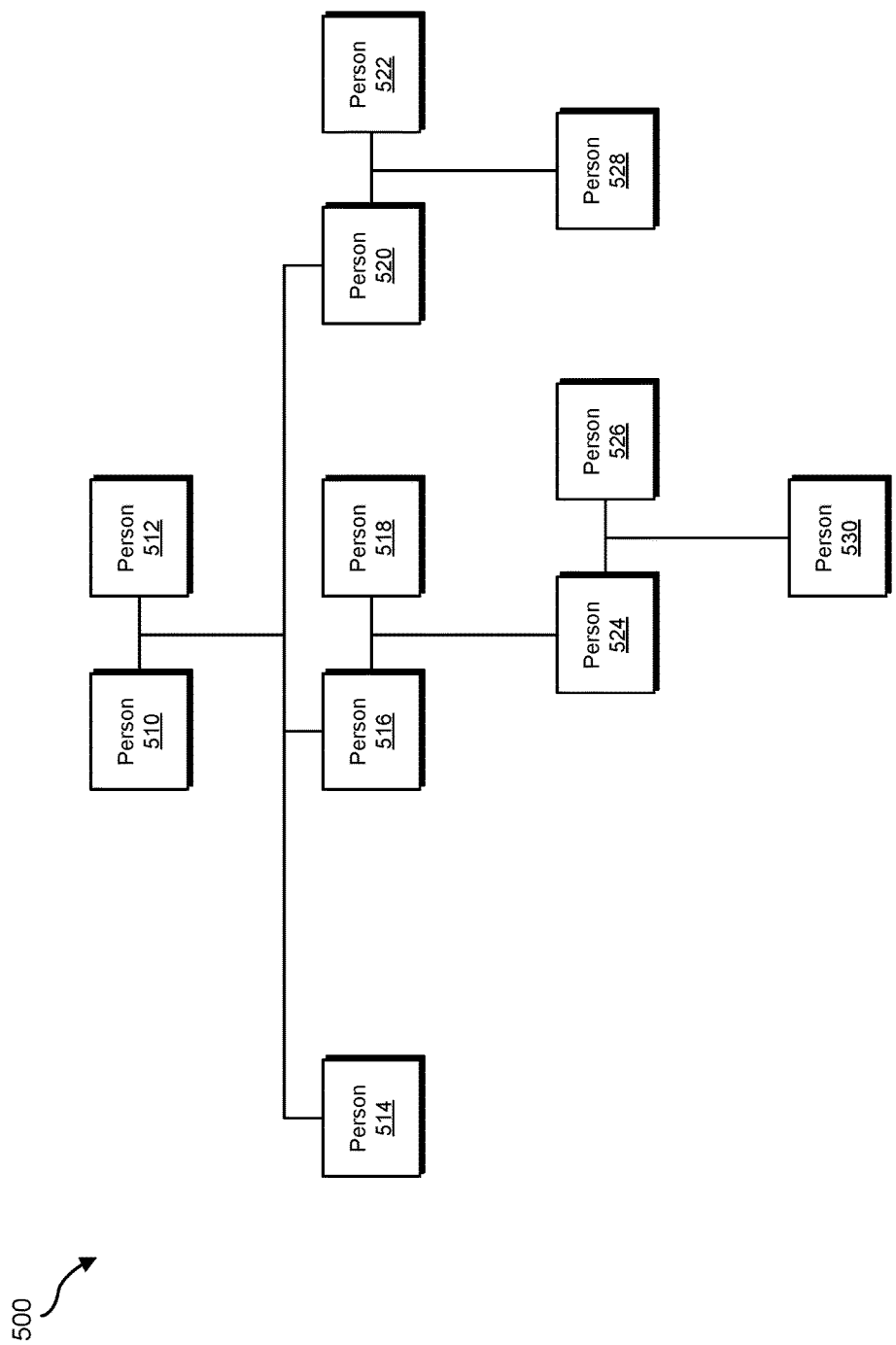
FIG. 5 is a block diagram of an exemplary family providing kinship-based accessibility to securely stored data.

FIG. 5 illustrates an exemplary family 500. As shown in FIG. 5, family 500 may include a person 510 and a person 512 with three children: a person 514, a person 156, and a person 520. Person 516 and person 518 may have one child: a person 524. Person 524 and a person 526 may have one child: a person 530. Person 520 and a person 522 may have one child: a person 528. In some examples, one or more individuals within family 500 may have user accounts that securely store encrypted data based on cryptographic keys derived from each individual's heritable biometric information. For example, person 516 may possess a user account storing data encrypted using a cryptographic key based on heritable biometric information possessed by person 516. In one example, the user account of person 516 may maintain two tiers of secure data storage: a higher tier may be protected using a k-out-of-n encryption scheme where k is approximately half of n. A lower tier may be protected using a k-out-of-n encryption scheme where k is approximately one-quarter of n. In one example, person 516 may die, leaving a large, encrypted digital estate. One or more immediate relatives of person 516, such as person 524, person 510, person 512, person 514, and/or person 520 may have an interest in the digital estate. For example, person 524 may wish to access the digital estate of person 516 for financial and/or sentimental purposes. Accordingly, person 524 may submit heritable biometric information received by receiving module 106 (e.g., to access both the higher tier and the lower tier of data). In one example, (e.g., due to a forensic irregularity), the heritable biometric information submitted by person 524 alone may not suffice. Accordingly, another family member, such as person 514, person 510, and/or person 518 may also submit heritable biometric information that may be used to supplement and/or modify the heritable biometric information submitted by person 524. In another example, person 530 may wish (e.g., alone) to access a portion of the digital estate of person 516. Accordingly, person 530 may submit heritable biometric information that may suffice to access the lower tier of data stored on behalf of person 516. In some examples, multiple family members of person 516 (e.g., both person 518 and person 524) may submit heritable biometric information to reduce the computational burden of obtaining a cryptographic key that decrypts the encrypted data stored on behalf of person 516.

Returning to FIG. 3, at step 304, one or more of the systems described herein may receive heritable biometric information obtained from a second person related to the first person within a predetermined degree. For example, receiving module 106 may, as part of computing device 202 in FIG. 2, receive heritable biometric information 232 obtained from a person 230 related to person 210 within a predetermined degree.

As used herein, the "degree" to which two people are related may refer to a genetic distance between the two people. In some examples, the "degree" to which two people are related may refer to a genetic distance between the two people relative to a broader population (e.g., all humans). For example, the genetic distance between an individual and the individual's immediate family members (e.g., parents, children, and/or siblings) may be approximately half of that between the individual and the general population, on average. Likewise, the genetic distance between an individual and the individual's immediate family members may be approximately three-quarters of that between the individual and the individual's grandparents, grandchildren, aunts, uncles, nieces, and/or nephews. In some examples, the "degree" to which two people are related may also refer to a type of relationship. For example, where the heritable biometric information includes uniparental biometric information (e.g., mitochondrial DNA or Y chromosomal DNA), the "degree" may specify a relationship involving a father-son relationship and/or a mother-child relationship.

Receiving module 106 may receive the heritable biometric information obtained from the second person in any suitable context. For example, receiving module 106 may receive the heritable biometric information obtained from the second person when the second person requests access to the first person's encrypted data (e.g., during an account recovery and/or data sharing request procedure). In some examples, receiving module 106 may receive an assertion from the second person specifying a claimed relationship between the first person and the second person. In some examples, receiving module 106 may determine which encrypted data the second person is eligible to access based on the relationship between the first and second person (e.g., an immediate family member may be entitled and/or able to decrypt a set of data whereas an extended family member may only be entitled and/or able to decrypt a subset of the data, which may have been separately encrypted with a k-out-of-n encryption scheme with a k value sufficiently low in proportion to the n value to permit an extended family member to decrypt the subset of the data).

Receiving module 106 may receive the heritable biometric information in any suitable manner. For example, receiving module 106 may receive a DNA profiling report. Additionally or alternatively, receiving module 106 may receive a set of values derived from a DNA profiling report (e.g., values that were derived using the same methodology as was used to process a DNA profiling report of the first user, such that values between the first and second users will match where genetic information matched). In some examples, receiving module 106 may receive data components for generating a cryptographic key.

The heritable biometric information may be obtained from the second person in any suitable manner. In one example, the heritable biometric information obtained from the second person may include a plurality of genetic markers obtained from the second person. For example, the heritable biometric information obtained from the second person may include a set of values, derived from a set of allele pairs, each value representing a characteristic of an allele (e.g., a length of the allele).

As discussed earlier, in one example, the first person may be female and the heritable biometric information obtained from the first person may be derived from mitochondrial DNA obtained from the first person. In this example, where the second person is a child of the first person, the heritable biometric information obtained from the second person may be derived from mitochondrial DNA obtained from the second person. Similarly, whether the first person is male or female, the heritable biometric information obtained from the first person may have been derived from mitochondrial DNA and the heritable biometric information obtained from the second person may derived from mitochondrial DNA obtained from the second person where the second person is a mother of the first person.

As discussed earlier, in one example, the first person may be male and the heritable biometric information obtained from the first person may be derived from a Y chromosome of the first person. Accordingly, where the second person is male (e.g., a son or father of the first person), the heritable biometric information obtained from the second person may be derived from a Y chromosome of the second person.

The heritable biometric information may have been obtained from the second person in any suitable manner. For example, the heritable biometric information may be obtained from the second person by obtaining biological material from the second person that contains DNA and then conducting a DNA profiling test with the biological material. In some examples, data derived from the DNA profiling test may be interpreted, transformed, and/or formatted according to a consistent, predefined mapping such that obtaining heritable biometric information from the same DNA will produce the same values (e.g., so that the values representing the heritable biometric information of the second person match values representing the heritable biometric information of the first person where the underlying genetic information matches).

Using FIG. 4 as an example, exemplary heritable biometric information 400 may include an allele set 430 belong to a relative (e.g., a child) of the possessor of allele set 410. Allele set 430 may include several allele pairs including, e.g., an allele pair 440. Allele pair 440 may include an allele 442 and an allele 444. As shown in FIG. 4, for each allele pair in allele set 430, one of the allele values may match a value in a corresponding allele pair from allele set 410 (e.g., because the matching allele was inherited from the possessor of allele set 410 by the possessor of allele set 430).

Returning to FIG. 3, at step 306, one or more of the systems described herein may generate a second cryptographic key based at least in part on the heritable biometric information obtained from the second person. For example, generation module 108 may, as part of computing device 202 in FIG. 2, generate second cryptographic key 234 based at least in part on heritable biometric information 232 obtained from person 230.

Generation module 108 may generate the second cryptographic key in any of a variety of ways. As explained earlier, in one example, the first cryptographic key may have been generated from heritable biometric information derived from uniparental (e.g., mitochondrial or Y chromosomal) DNA obtained from the first person. Accordingly, generation module 108 may generate the second cryptographic key from matching elements of the mitochondrial DNA obtained from the second person (e.g., such that the first and second cryptographic keys are identical). In some examples, the first cryptographic key may have been derived from allele pairs present in the first person. Accordingly, generation module 108 may generate the second cryptographic key by selecting, for each allele pair, an allele in a corresponding allele pair of the second person to contribute to the second cryptographic key. For example, where the second person is a child of the first person, the second person may ordinarily have inherited one allele for each allele pair from the first person. Thus, in order to generate the second cryptographic key, generation module 108 may select, for each allele pair, the allele contributed to the second person by the first person. Thus, in an example in which the first cryptographic key was composed of 60 secret values derived from alleles in 30 allele pairs possessed by the first person, the second person may possess 30 of the secret values in the 30 allele pairs. Accordingly, where the first cryptographic key was used to encrypt the encrypted data using a 30-out-of-60 cryptographic scheme, 30 secret values may suffice to generate the second cryptographic key to decrypt the encrypted data.

However, which allele for each allele pair was the allele contributed to the second person by the first person may be unknown a priori. Accordingly, generation module 108 may search for the correction combination of alleles to select from the allele pairs. For example, generation module 108 may generate the second cryptographic key by generating a plurality of candidate cryptographic keys by selecting, for each candidate cryptographic key in the plurality of candidate cryptographic keys, a different combination of alleles from a plurality of allele pairs present in the second person that correspond to the plurality of allele pairs present in the first person and testing each candidate cryptographic key in the plurality of candidate cryptographic keys until identifying the second cryptographic key that successfully decrypts the encrypted data. For example, where 30 allele pairs were used to generate the first cryptographic key using a 30-out-of-60 encryption scheme, generation module 108 may search through 2^30 possible combinations of allele selections from the allele pairs until identifying the correct set of allele values (e.g., the set of allele values that were inherited from the first person and which, therefore, may be used to generate a cryptographic key to decrypt the encrypted data).

In some examples, generation module 108 may generate the second cryptographic key further based at least in part on heritable biometric information obtained from a third person related to the first person. For example, in order to decrease the computational difficulty of identifying the correct set of alleles, generation module 108 use a third person to narrow and/or prioritize the search through possible allele combinations. For example, where the third person is also related to the first person, alleles in common between the second and third persons may be more likely to be alleles possessed by the first person. Accordingly, generation module 108 may search allele combinations that include the alleles in common first, potentially reducing search time. In some examples, the first person may be a parent of the second person and a fourth person may not be biologically related to the first person but may be the other parent (or related to the other parent) of the second person. In these examples, generation module 108 may identify alleles in common between the second person and the fourth person and prioritize allele combinations that exclude the alleles held in common between the second person and the fourth person (since, e.g., these common alleles may be those that the second person inherited from the other parent rather than from the first person).

Using FIG. 4 as an example, allele set 410 shows eight allele pairs with sixteen total allele values. Accordingly, a possessor of allele set 410 may have contributed the sixteen allele values of allele set 410 to create a cryptographic key used to encrypt data pertaining to the possessor of allele set 410 using a k-out-of-n encryption scheme (e.g., an 8-out-of-16 encryption scheme). Thus, the possessor of allele set 430 may possess sufficient information to generate a cryptographic key capable of decrypting the encrypted data, because the possessor of allele set 430 possesses a matching allele value for each allele pair. Accordingly, generation module 108 may generate the second cryptographic key by selecting the eight matching allele values from the respective allele pairs in allele set 430 (in this example, by selecting {5, 9, 29, 19, 12, 17, 17, 22}). In order to select the correct combination of allele values, generation module 108 may search through the possible combinations of allele values resulting from arbitrarily selecting an allele value from each allele pair. Thus, for example, generation module 108 may select {5, 9, 8, 19, 4, 8, 12, 21} and fail, then select {5, 9, 8, 19, 4, 8, 12, 22} and fail, but may eventually select {5, 9, 29, 19, 12, 17, 17, 22} by systematically attempting each possible combination until successfully generating the second cryptographic key (placing the ceiling of the number of attempts at 2^8 or 256).

Returning to FIG. 3, at step 308, one or more of the systems described herein may decrypt the encrypted data that is encrypted with the first cryptographic key derived from the heritable biometric information obtained from the first person by using the second cryptographic key generated based at least in part on the heritable biometric information obtained from the second person. For example, decryption module 110 may, as part of computing device 202 in FIG. 2, decrypt encrypted data 220 that is encrypted with cryptographic key 214 derived from heritable biometric information 212 obtained from person 210 by using second cryptographic key 234 generated based at least in part on heritable biometric information 232 obtained from person 230.

Decryption module 110 may decrypt the encrypted data in any suitable manner. For example, decryption module 110 may decrypt a decryption key using the second cryptographic key, and may then use the resulting decryption key to decrypt data stored on behalf of the first person. Additionally or alternatively, decryption module 110 may directly decrypt one or more electronic documents with the cryptographic key. In some examples, decryption module 110 may decrypt the encrypted data according to a k-out-of-n encryption scheme.

As mentioned earlier, in some examples, the encrypted data may be stored pseudonymously. Accordingly, decryption module 110 may determine the decryption target by receiving a pseudonymous identifier (e.g., from the second person and/or from generation module 108, which may have previously received the pseudonymous identifier in order to test candidate cryptographic keys).

Upon decrypting the encrypted data, in some examples, decryption module 110 may provide access to the encrypted data in plaintext form to the second person. For example, decryption module 110 may transmit the plaintext to the second person. Additionally or alternatively, decryption module 110 may reencrypt the plaintext using a cryptographic key corresponding to the second person and associate the reencrypted data with a user account of the second person.

As explained above in connection with method 300 in FIG. 3, a genetic marker may consist of two alleles: one inherited from the mother and the other from the father. Each allele may be associated with a value that represents a number of full or partial repetitions of DNA base elements and may introduce approximately 4 bits of entropy. Genetic tests may use several genetic markers. In one example, for the genetic marker D18551, the mother may have allele sizes (12, 21), the father may have allele sizes (15, 17), and the child may have allele sizes (12, 15).

A user may encrypt cloud data with a random key and may then XOR the key with a value derived from the user's allele values. Because DNA is not revocable, the cloud data may be stored anonymously using a unique user identifier that is not traceable back to the user without client side authentication (e.g., according to a cloud storage system practice).

A genetic relative may present her own DNA to attempt the digital asset decryption. Direct relatives (such as parents and children) may share exactly one allele in each genetic marker. Accordingly, the first step of the decryption task may include identifying, for each genetic marker, which allele was inherited from the asset owner. If n genetic markers were used, the number of combinations to check may be $2^n$. To achieve secrecy comparable with AES-128, systems may use approximately 30 genetic markers. In some examples, approximately 30 seconds of processing time may check all $2^{30}$ combinations.

When only k genes out of n are shared between the encryptor and the decryptor, k-out-of-n decryption may allow decryption (e.g., where only k portions of a key are needed to decrypt the entire data). In some examples, decryption may be performed within $(2^k)*n!/k!(n-k)!$ operations. The computational complexity of decryption may be further decreased when more than one genetic relative is available. For instance, if both a spouse and a child request access to the digital estate, the encryptor's genetic markers may be more easily identified.

Figure 6:
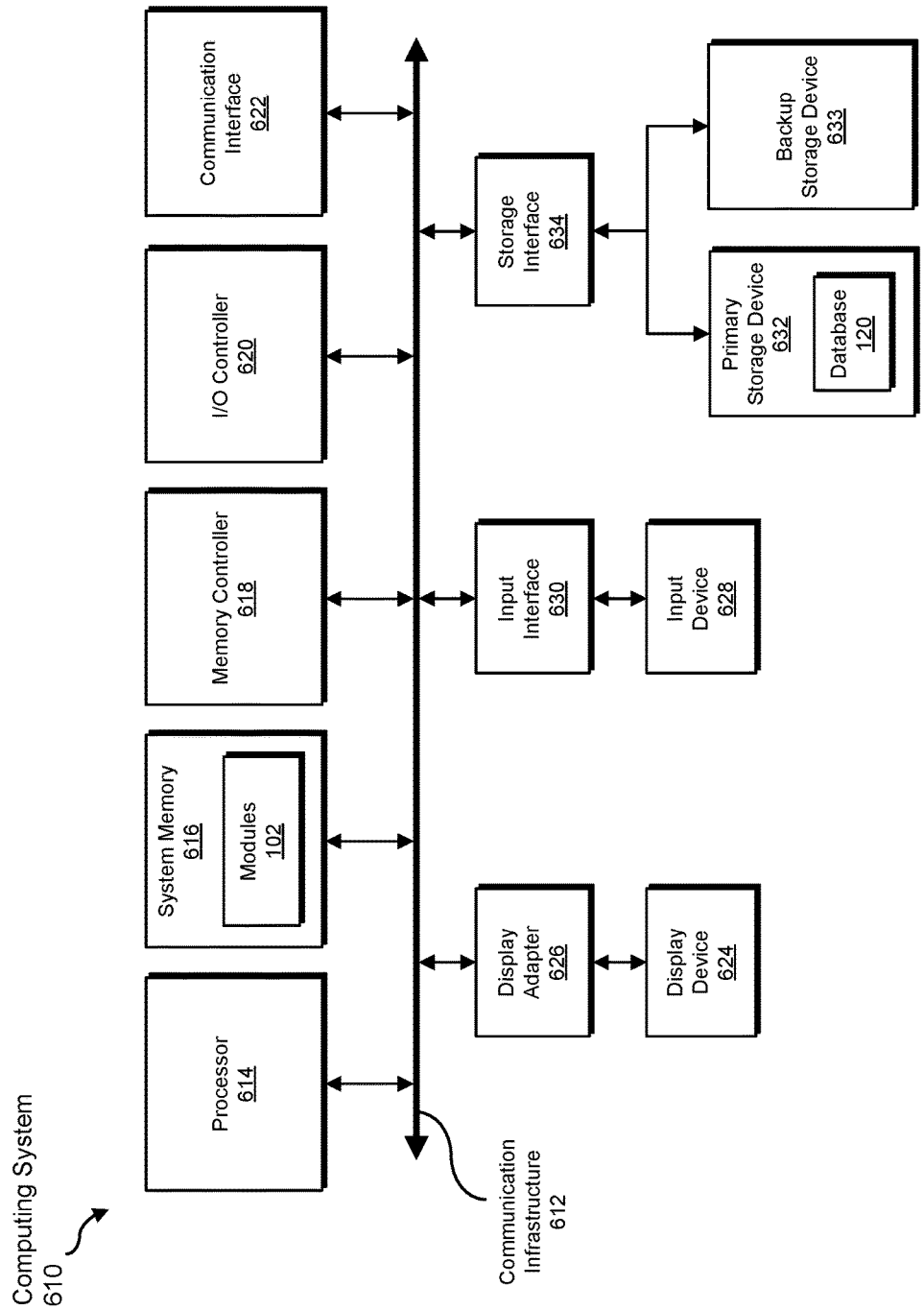
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
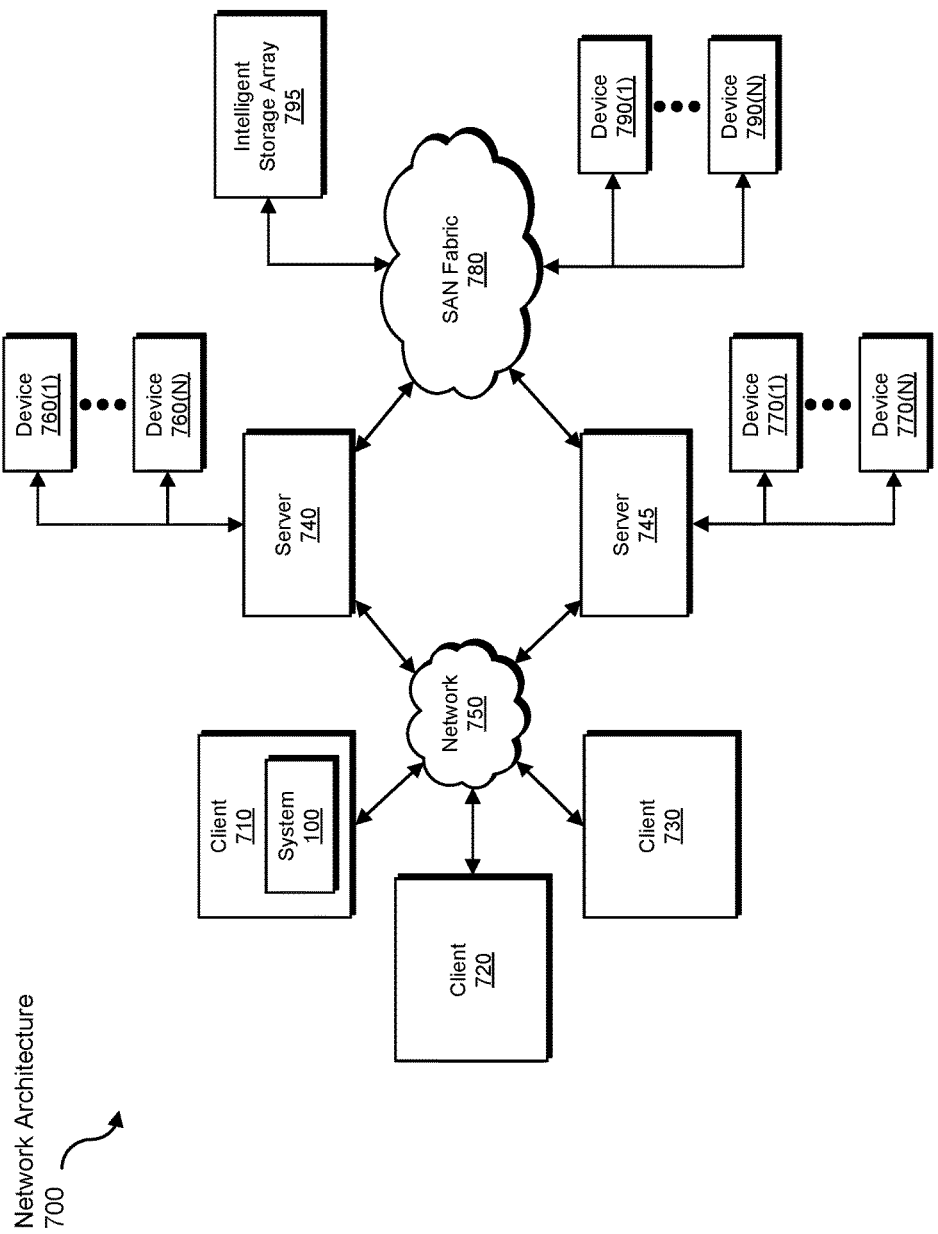
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing kinship-based accessibility to securely stored data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive biometric data to be transformed, transform the biometric data to a decryption key, output a result of the transformation to a decryption function, use the result of the transformation to decrypt encrypted data, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing kinship-based accessibility to securely stored data, at least a portion of the method being performed by a computing device comprising at least one processor, the method comprising:

identifying encrypted data that is encrypted with a first cryptographic key which was derived from heritable biometric information obtained from a first person;

receiving heritable biometric information obtained from a second person related to the first person within a predetermined degree;

generating a second cryptographic key based at least in part on the heritable biometric information obtained from the second person;

decrypting the encrypted data that is encrypted with the first cryptographic key derived from the heritable biometric information obtained from the first person by using the second cryptographic key generated based at least in part on the heritable biometric information obtained from the second person; and providing access to the encrypted data to the second person after decrypting the encrypted data;

wherein the heritable biometric information obtained from the first person comprises a plurality of genetic markers obtained from the first person and the heritable biometric information obtained from the second person comprises a plurality of genetic markers obtained from the second person.

2. The computer-implemented method of claim 1, wherein the first person comprises a first female person.

3. The computer-implemented method of claim 2, wherein:
the heritable biometric information obtained from the first person is derived from mitochondrial DNA obtained from the first person; and
the heritable biometric information obtained from the second person is derived from mitochondrial DNA obtained from the second person.

4. The computer-implemented method of claim 1, wherein:
the first person comprises a first male person;
the second person comprises a second male person;
the heritable biometric information obtained from the first person is derived from a Y chromosome of the first person; and
the heritable biometric information obtained from the second person is derived from a Y chromosome of the second person.

5. The computer-implemented method of claim 1, wherein the encrypted data is encrypted with the first cryptographic key using a k-out-of-n encryption scheme.

6. The computer-implemented method of claim 5, wherein:
the first cryptographic key was derived from a plurality of allele pairs present in the first person; and
generating the second cryptographic key comprises selecting, for each allele pair in the plurality of allele pairs, an allele in a corresponding allele pair of the second person to contribute to the second cryptographic key.

7. The computer-implemented method of claim 6, wherein generating the second cryptographic key comprises:
generating a plurality of candidate cryptographic keys by selecting, for each candidate cryptographic key in the plurality of candidate cryptographic keys, a different combination of alleles from a plurality of allele pairs present in the second person that correspond to the plurality of allele pairs present in the first person; and
testing each candidate cryptographic key in the plurality of candidate cryptographic keys until identifying the second cryptographic key that successfully decrypts the encrypted data.

8. The computer-implemented method of claim 5, wherein a parameter of the k-out-of-n encryption scheme is selected based at least in part on a relationship requirement for decrypting the encrypted data that specifies how closely related the first person and a candidate person are to be related for the candidate person to access the encrypted data in plaintext form.

9. The computer-implemented method of claim 5, wherein a parameter of the k-out-of-n encryption scheme is selected based at least in part on a computational threshold, wherein a computational burden imposed by searching for the second cryptographic key based on heritable biometric information obtained from the second person falls below the computational threshold and a computational burden imposed by searching for the second cryptographic key without heritable biometric information obtained from any person with a genetic relationship to the first person as close as a genetic relationship between the first person and the second person rises above the computational threshold.

10. The computer-implemented method of claim 1, wherein generating the second cryptographic key is further based at least in part on heritable biometric information obtained from a third person related to the first person.

11. The computer-implemented method of claim 1, wherein the encrypted data is stored on behalf of the first person pseudonymously.

12. The computer-implemented method of claim 1, wherein decrypting the encrypted data comprises decrypting an additional cryptographic key.

13. The computer-implemented method of claim 12, wherein the additional cryptographic key is capable of decrypting private data owned by the first person.

14. A system for providing kinship-based accessibility to securely stored data, the system comprising:
an identification module, stored in memory, that identifies encrypted data that is encrypted with a first cryptographic key which was derived from heritable biometric information obtained from a first person;
a receiving module, stored in memory, that receives heritable biometric information obtained from a second person related to the first person within a predetermined degree;
a generation module, stored in memory, that generates a second cryptographic key based at least in part on the heritable biometric information obtained from the second person;
a decryption module, stored in memory, that:
decrypts the encrypted data that is encrypted with the first cryptographic key derived from the heritable biometric information obtained from the first person by using the second cryptographic key generated based at least in part on the heritable biometric information obtained from the second person; and
provides access to the encrypted data to the second person after decrypting the encrypted data; and
at least one physical processor configured to execute the identification module, the receiving module, the generation module, and the decryption module;
wherein the heritable biometric information obtained from the first person comprises a plurality of genetic markers obtained from the first person and the heritable biometric information obtained from the second person comprises a plurality of genetic markers obtained from the second person.

15. The system of claim 14, wherein the first person comprises a first female person.

16. The system of claim 15, wherein:
the second person comprises a second female person;
the heritable biometric information obtained from the first person is derived from mitochondrial DNA obtained from the first person; and
the heritable biometric information obtained from the second person is derived from mitochondrial DNA obtained from the second person.

17. The system of claim 14, wherein:
the first person comprises a first male person;
the second person comprises a second male person;
the heritable biometric information obtained from the first person is derived from a Y chromosome of the first person; and
the heritable biometric information obtained from the second person is derived from a Y chromosome of the second person.

18. The system of claim 14, wherein the encrypted data is encrypted with the first cryptographic key using a k-out-of-n encryption scheme.

19. The system of claim 18, wherein:
the first cryptographic key was derived from a plurality of allele pairs present in the first person; and
the generation module generates the second cryptographic key by selecting, for each allele pair in the plurality of allele pairs, an allele in a corresponding allele pair of the second person to contribute to the second cryptographic key.

20. A non-transitory computer-readable medium comprising one or more computer-readable instructions that, when executed by at least one processor of a computing device, cause the computing device to:
identify encrypted data that is encrypted with a first cryptographic key which was derived from heritable biometric information obtained from a first person;
receive heritable biometric information obtained from a second person related to the first person within a predetermined degree;
generate a second cryptographic key based at least in part on the heritable biometric information obtained from the second person;
decrypt the encrypted data that is encrypted with the first cryptographic key derived from the heritable biometric information obtained from the first person by using the second cryptographic key generated based at least in part on the heritable biometric information obtained from the second person; and
provide access to the encrypted data to the second person after decrypting the encrypted data;
wherein the heritable biometric information obtained from the first person comprises a plurality of genetic markers obtained from the first person and the heritable biometric information obtained from the second person comprises a plurality of genetic markers obtained from the second person.

* * * * *